(12) United States Patent
Wang et al.

(10) Patent No.: US 9,972,314 B2
(45) Date of Patent: May 15, 2018

(54) NO LOSS-OPTIMIZATION FOR WEIGHTED TRANSDUCER

(71) Applicant: Microsoft Technology Licensing, LLC, Redmond, WA (US)

(72) Inventors: Zhenghao Wang, Bellevue, WA (US); Xuedong Huang, Bellevue, WA (US); Huaming Wang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 15/170,756

(22) Filed: Jun. 1, 2016

(65) Prior Publication Data

US 2017/0352348 A1 Dec. 7, 2017

(51) Int. Cl.
| | | |
|---|---|---|
| *G10L 15/00* | (2013.01) | |
| *G10L 15/193* | (2013.01) | |
| *G10L 15/30* | (2013.01) | |
| *G06F 17/27* | (2006.01) | |
| *G10L 15/197* | (2013.01) | |

(52) U.S. Cl.
CPC .......... *G10L 15/193* (2013.01); *G06F 17/277* (2013.01); *G06F 17/2775* (2013.01); *G10L 15/197* (2013.01); *G10L 15/30* (2013.01)

(58) Field of Classification Search
USPC ................. 704/231–257, 270–275
See application file for complete search history.

(56) References Cited

U.S. PATENT DOCUMENTS

| | | | |
|---|---|---|---|
| 5,610,812 A | 3/1997 | Schabes et al. | |
| 5,781,884 A | 7/1998 | Pereira et al. | |
| 6,243,679 B1 | 6/2001 | Mohri et al. | |
| 6,574,597 B1* | 6/2003 | Mohri | G10L 15/183 |
| | | | 704/251 |
| 7,181,386 B2 | 2/2007 | Mohri et al. | |
| 7,240,004 B1 | 7/2007 | Allauzen et al. | |
| 2005/0288928 A1* | 12/2005 | Bergl | G10L 15/083 |
| | | | 704/242 |
| 2008/0046229 A1 | 2/2008 | Maskey et al. | |
| 2013/0138441 A1 | 5/2013 | Kim et al. | |
| 2013/0311182 A1* | 11/2013 | Kim | G10L 15/04 |
| | | | 704/240 |
| 2014/0149119 A1 | 5/2014 | Sak et al. | |
| 2016/0093292 A1* | 3/2016 | Hofer | G10L 15/02 |
| | | | 704/240 |

(Continued)

OTHER PUBLICATIONS

Allauzen, et al., "A Generalized Composition Algorithm for Weighted Finite-State Transducers", In Proceedings of 10th Annual Conference of the International Speech Communication Association, Sep. 6, 2009, 4 pages.

(Continued)

*Primary Examiner* — Jesse Pullias
(74) *Attorney, Agent, or Firm* — Schwegman Lundberg & Woessner, P.A.

(57) ABSTRACT

Techniques and architectures may be used to generate and perform a process using weighted finite-state transducers involving generic input search graphs. The process need not pursue theoretical optimality and instead search graphs may be optimized without an a priori optimization step. The process may result in an automatic speech recognition (ASR) decoder that is substantially faster than ASR decoders the include the optimization step.

15 Claims, 5 Drawing Sheets

(56) References Cited

U.S. PATENT DOCUMENTS

2016/0093297 A1* 3/2016 Deisher ............... G10L 15/285
704/236

OTHER PUBLICATIONS

Chen, et al., "Pronunciation and Silence Probability Modeling for ASR", In Proceedings of 16th Annual Conference of the International Speech Communication Association, Sep. 6, 2015, 5 pages.
Dobrisek, et al., "Towards the Optimal Minimization of a Pronunciation Dictionary Model", In Proceedings of the 13th International Conference on Text, speech and dialogue, Sep. 6, 2010, 4 pages.
Guo, et al., "Fast Speech Recognition System Using Weighted Finite-state Transducers", In Journal of Information & Computational Science, vol. 9, Iss. 18, Dec. 30, 2012, pp. 5807-5814.
Guo, et al., "Optimized large vocabulary WFST speech recognition system", In Proceedings of 9th International Conference on Fuzzy Systems and Knowledge Discovery, May 29, 2015, pp. 1243-1247.
Hoffmeister, et al., "WFST Enabled Solutions to ASR Problems: Beyond HMM Decoding", In Proceedings of IEEE Transactions on Audio, Speech, and Language Processing, vol. 20, Iss. 2, Feb. 2012, pp. 551-564.
Mohri, "A Disambiguation of Finite Automata and Functional Transducers", In Journal of International Journal of Foundations of Computer Science, vol. 24, Issue 6, Sep. 2013, 13 pages.
Mohri, et al., "On the Disambiguation of Weighted Automata", In Proceedings of 20th International Conference on Implementation and Application of Automata, Aug. 18, 2015, 17 pages.
Mohri, et al., "Speech Recognition with Weighted Finite-State Transducers", In the Journal of Springer Handbook of Speech Processing, 2008, 31 pages.
Mohri, "Weighted Automata Algorithms", In Publication of Springer Berlin Heidelberg, Sep. 16, 2009, 7 pages.
Nabende, "Transliteration system using pair HMM with weighted FSTs", In Proceedings of the Named Entities Workshop, Aug. 7, 2009, pp. 100-103.
Rybach, et al., "A Comparative Analysis of Dynamic Network Decoding", In Proceedings of IEEE International Conference on Acoustics, Speech and Signal Processing, May 22, 2011, pp. 5184-5187.
Mohri, Mehryar, "Finite-State Transducers in Language and Speech Processing", In Journal of Computational Linguistics, vol. 23, Issue 2, Jun. 1997, pp. 269-311.
"International Search Report and Written Opinion Issued in PCT Application No. PCT/US2017/034598", dated Dec. 11, 2017, 17 Pages.

* cited by examiner

```
1   i' ← {(i, λ(i)) : i ∈ I}
2   λ'(i') ← 1̄        ← INITIAL WEIGHT
3   S ← {i'}
4   while S ≠ ∅ do
5       p' ← HEAD(S)
6       DEQUEUE(S)
7       for each x ∈ i[E[Q[p']]] do
8           w' ← ⊕ {v ⊗ w : (p, v) ∈ p', (p, x, w, q) ∈ E}
9           q' ← {(q, ⊕ {w'⁻¹ ⊗ (v ⊗ w) : (p, v) ∈ p', (p, x, w, q) ∈ E}) :
                  q = n[e], i[e] = x, e ∈ E[Q[p']]}
10          E' ← E' ∪ {(p', x, w', q')}
11          if q' ∉ Q' then
12              Q' ← Q' ∪ {q'}
13              if Q[q'] ∩ F ≠ ∅ then
14                  F' ← F' ∪ {q'}
15                  ρ'(q') ← ⊕ {v ⊗ ρ(q) : (q, v) ∈ q', q ∈ F}
16                  ENQUEUE(S, q')
17  return T'
```

NO LOSS-OPTIMIZATION FOR WEIGHTED TRANSDUCER

BACKGROUND

A goal of automatic speech recognition (ASR) is generally to recognize words given some audio signal. ASR may be represented probabilistically as a maximization problem, where a word sequence is chosen to have the highest likelihood given an acoustic sequence. Such maximization problems may involve finite-state transducers, which are generally used in recognition applications, such as speech or handwriting recognition, gesture recognition and so on. For example, finite-state transducers may be used in speech-to-text and text-to-speech systems to represent various aspects of a recognition and/or a conversion process.

Weighted finite-state transducers may be used to provide a common representation for each component of a complex system in many applications. Such weighted finite-state transducers may involve methods for simplifying and/or combining components, such as the composition of two weighted finite-state transducers. A finite-state transducer is deterministic if that finite-state transducer has a unique initial state and if no two transitions of the finite-state transducer leaving the same state have the same input label.

SUMMARY

This disclosure describes techniques and architectures for generating and performing a process using weighted finite-state transducers involving generic input search graphs. The process need not pursue theoretical optimality and instead search graphs may be optimized without an a priori optimization step. The process may result in an automatic speech recognition (ASR) decoder that is substantially faster than ASR decoders that include the optimization step.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The term "techniques," for instance, may refer to system(s), method(s), computer-readable instructions, module(s), algorithms, hardware logic (e.g., Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs)), quantum devices, such as quantum computers or quantum annealers, and/or other technique(s) as permitted by the context above and throughout the document.

BRIEF DESCRIPTION OF THE DRAWINGS

The detailed description is set forth with reference to the accompanying figures. In the figures, the left-most digit of a reference number identifies the figure in which the reference number first appears. The use of the same reference numbers in different figures indicates similar or identical items or features.

DETAILED DESCRIPTION

Techniques and architectures described herein involve speech recognition based, at least in part, on weighted finite-state transducers (WFSTs). Such transducers provide a representation for components of speech recognition systems, including hidden Markov models (HMMs), context-dependency models, pronunciation dictionaries, and statistical grammars, just to name a few examples.

In some examples, large-vocabulary speech recognition may be based, at least in part, on models such as hidden HMMs, lexicons, or n-gram statistical language models that can be represented by WFSTs. A finite-state transducer is a finite automaton whose state transitions are labeled with both input and output symbols. Therefore, a path through the transducer encodes a mapping from an input symbol sequence, or string, to an output string. A weighted transducer places weights on transitions in addition to the input and output. Weights may encode probabilities, durations, penalties, or any other quantity that accumulates along paths to compute the overall weight of mapping an input string to an output string.

In some examples, combining and optimizing probabilistic models in speech processing can be generalized and efficiently implemented by translation to mathematically well-defined operations on weighted transducers. In particular implementations, such optimizations may include techniques that avoid pursuing theoretical optimality, and the weighted transducers maybe operated on without particular modifications, as discussed below.

In various examples of automatic speech recognition (ASR), word sequences may be represented by a grammar that can be represented by a directed graph with probabilities on arcs in the graph and words on either the arcs or the vertices. N-gram language models, which are generally not considered to be graphs, can be represented in this way. In a probabilistic interpretation, the graph is considered to be a generative model, which may be a finite state machine (FSM), also known as a finite state automaton (FSA). In FSM terminology, the arcs are transitions and the vertices are states, for example.

If an input associated with each output is added to an FSM, the resulting automaton can generate output and can be constrained by an external input sequence. Such an FSM is known as a Finite State Transducer (FST).

In some ASR examples, a grammar may be used to restrict the possible word sequences to be recognized. The grammar can be represented by an FST G, which has start and end symbols and 'matched' input and output symbols. Another FST is the lexicon L, which may represent a sequence of pronunciations.

Generally, composition is an operation that takes two transducers and finds all possible paths through each transducer such that the output labels of the first and the input labels of the second transducer produce the same sequence. Such a transducer operation is a process for combining different levels of representation. The output of a composition operation is another transducer representing those matching paths, with the input labels of the first transducer and the outputs of the second transducer. The matching labels are annihilated. Mathematically, the composition of lexicon L and grammar G is written as $$L \circ G.$$

Both context dependency and HMMs can also be represented as transducers. The general ASR grammar composition can then be written as $$H \circ C \circ L \circ G,$$

where C is a context dependency transducer, which will be described below.

FSTs as described so far are capable of representing the structural aspects of ASR grammars. The probabilistic aspects are now addressed.

Probability may generally be represented by associating a weight with each FST transition, the resulting FST being known as a weighted FST or WFST. Generally. WFSTs need not be associated with a particular type of weight. A mathematical concept known as a semi-ring may be used to specify how weights can be combined during WFST operations, such as composition and determinisation.

Various examples are described further with reference to FIGS. 1-8.

Figure 1:
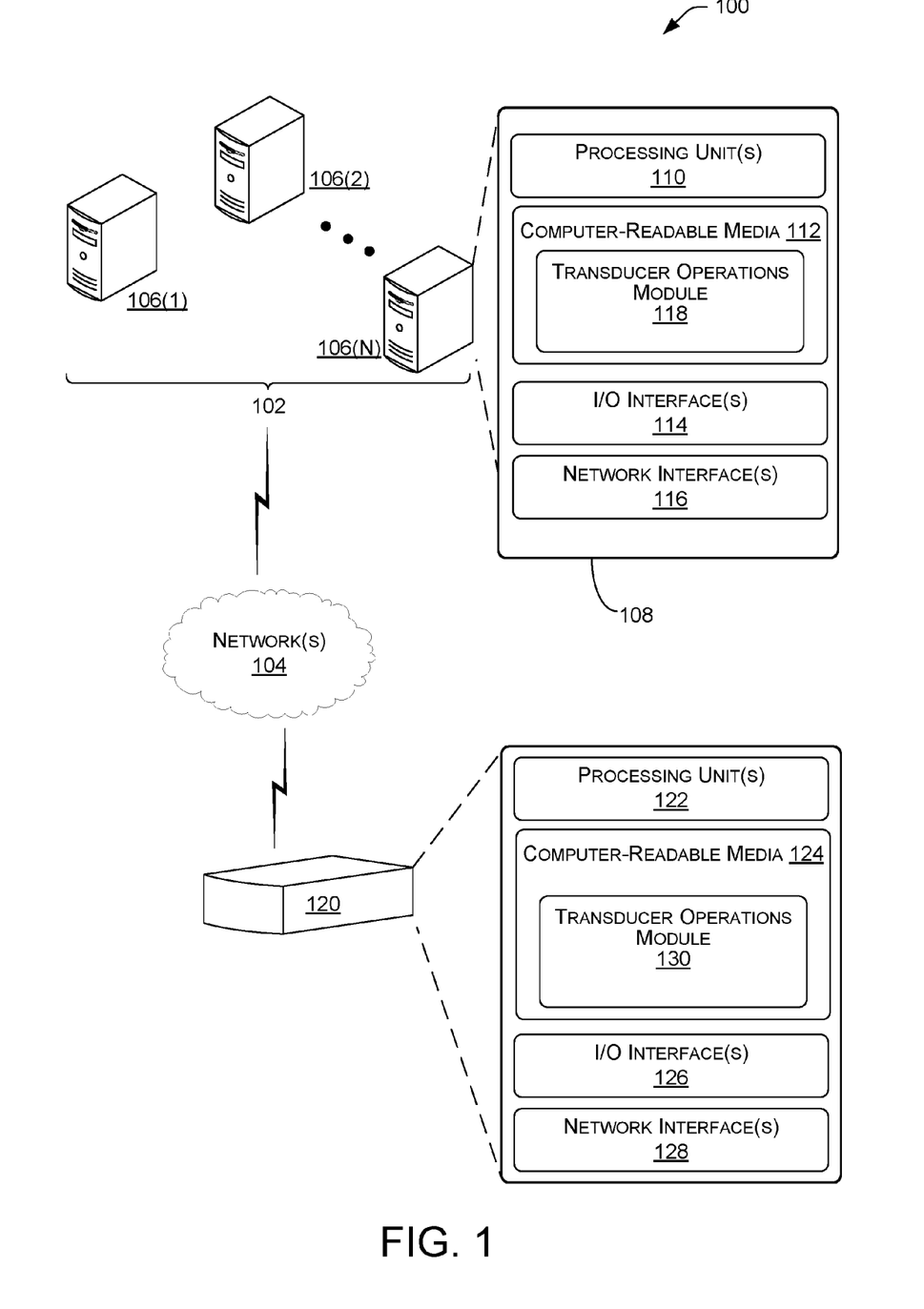
FIG. 1 is a block diagram depicting an environment for generating and operating with weighted finite-state transducers, according to various examples.

FIG. 1 is a block diagram depicting an environment 100 for generating and operating with weighted finite-state transducers, according to various examples. In some examples, the various devices and/or components of environment 100 include distributed computing resources 102 that may communicate with one another and with external devices via one or more networks 104.

For example, network(s) 104 may include public networks such as the Internet, private networks such as an institutional and/or personal intranet, or some combination of private and public networks. Network(s) 104 may also include any type of wired and/or wireless network, including but not limited to local area networks (LANs), wide area networks (WANs), satellite networks, cable networks, Wi-Fi networks, WiMax networks, mobile communications networks (e.g., 3G, 4G, 5G, and so forth) or any combination thereof. Network(s) 104 may utilize communications protocols, including packet-based and/or datagram-based protocols such as internet protocol (IP), transmission control protocol (TCP), user datagram protocol (UDP), or other types of protocols. Moreover, network(s) 104 may also include a number of devices that facilitate network communications and/or form a hardware basis for the networks, such as switches, routers, gateways, access points, firewalls, base stations, repeaters, backbone devices, and the like.

In some examples, network(s) 104 may further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 1302.11 standards (e.g., 1302.11g, 1302.11n, and so forth), and other standards. Network(s) 104 may also include network memory, which may be located in a cloud, for example. Such a cloud may be configured to perform actions based on executable code, such as in cloud computing, for example.

In various examples, distributed computing resource(s) 102 includes computing devices such as devices 106(1)-106(N). Examples support scenarios where device(s) 106 may include one or more computing devices that operate in a cluster or other grouped configuration to share resources, balance load, increase performance, provide fail-over support or redundancy, or for other purposes. Although illustrated as desktop computers, device(s) 106 may include a diverse variety of device types and are not limited to any particular type of device. Device(s) 106 may include specialized computing device(s) 108.

For example, device(s) 106 may include any type of computing device, including a device that performs cloud data storage and/or cloud computing, having one or more processing unit(s) 110 operably connected to computer-readable media 112. I/O interfaces(s) 114, and network interface(s) 116. Computer-readable media 112 may have a transducer operations module 118 stored thereon. For example, transducer operations module 118 may comprise computer-readable code that, when executed by processing unit(s) 110, perform transducer operations. In some cases, however, a transducer operations module need not be present in specialized computing device(s) 108.

A specialized computing device(s) 120, which may communicate with device(s) 106 (including network storage, such as a cloud memory/computing) via networks(s) 104, may include any type of computing device having one or more processing unit(s) 122 operably connected to computer-readable media 124, I/O interface(s) 126, and network interface(s) 128. Computer-readable media 124 may have a specialized computing device-side transducer operations module 130 stored thereon. For example, similar to or the same as transducer operations module 118, transducer operations module 130 may comprise computer-readable code that, when executed by processing unit(s) 122, perform transducer operations. In some cases, however, a transducer operations module need not be present in specialized computing device(s) 120. For example, such a transducer operations module may be located in network(s) 104.

In some examples, any of device(s) 106 may be entities corresponding to sellers or presenters of data, buyers or evaluators of data, or a network data storage and/or computing device such as a cloud.

Figure 2:
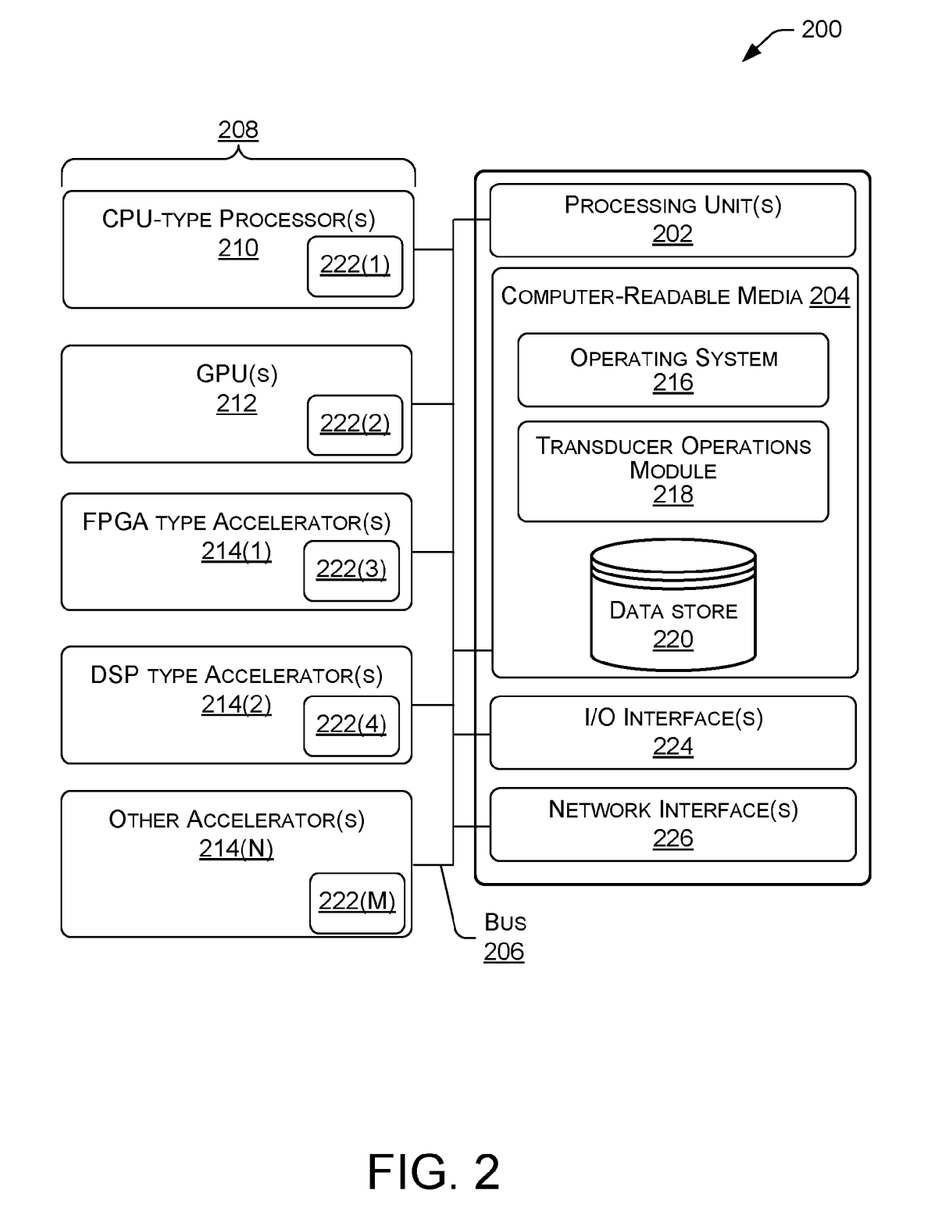
FIG. 2 is a block diagram depicting a device for generating and operating with weighted finite-state transducers, according to various examples.

FIG. 2 depicts an illustrative device 200, which may represent device(s) 106 or 108, for example. Illustrative device 200 may include any type of computing device having one or more processing unit(s) 202, such as processing unit(s) 110 or 122, operably connected to computer-readable media 204, such as computer-readable media 112 or 124. The connection may be via a bus 206, which in some instances may include one or more of a system bus, a data bus, an address bus, a PCI bus, a Mini-PCI bus, and any variety of local, peripheral, and/or independent buses, or via another operable connection. Processing unit(s) 202 may represent, for example, a CPU incorporated in device 200. The processing unit(s) 202 may similarly be operably connected to computer-readable media 204.

The computer-readable media 204 may include, at least, two types of computer-readable media, namely computer storage media and communication media. Computer storage media may include volatile and non-volatile machine-readable, removable, and non-removable media implemented in any method or technology for storage of information (in compressed or uncompressed form), such as computer (or other electronic device) readable instructions, data structures, program modules, or other data to perform processes or methods described herein. Computer storage media include, but are not limited to hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. For purposes of the claims, the phrase "computer storage medium," "computer-readable storage medium" and variations thereof, does not include waves, signals, and/or other transitory and/or intangible communication media, per se.

In contrast, communication media may embody computer-readable instructions, data structures, program modules, or other data in a modulated data signal, such as a carrier wave, or other transmission mechanism. As defined herein, computer storage media does not include communication media.

In some implementations, Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Device 200 may include, but is not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device such as one or more separate processor device(s) 208, such as CPU-type processors (e.g., micro-processors) 210, GPUs 212, or accelerator device(s) 214.

In some examples, as shown regarding device 200, computer-readable media 204 may store instructions executable by the processing unit(s) 202, which may represent a CPU incorporated in device 200. Computer-readable media 204 may also store instructions executable by an external CPU-type processor 210, executable by a GPU 212, and/or executable by an accelerator 214, such as an FPGA type accelerator 214(1), a DSP type accelerator 214(2), or any internal or external accelerator 214(N).

Executable instructions stored on computer-readable media 202 may include, for example, an operating system 216, a transducer operations module 218, and other modules, programs, or applications that may be loadable and executable by processing units(s) 202, and/or 210. For example, transducer operations module 218 may comprise computer-readable code that, when executed by processing unit(s) 202, perform transducer operations. In some cases, however, a transducer operations module need not be present in device 200.

Alternatively, or in addition, the functionally described herein may be performed by one or more hardware logic components such as accelerators 214. For example, and without limitation, illustrative types of hardware logic components that may be used include Field-programmable Gate Arrays (FPGAs), Application-specific Integrated Circuits (ASICs), Application-specific Standard Products (ASSPs), quantum devices, such as quantum computers or quantum annealers, System-on-a-chip systems (SOCs), Complex Programmable Logic Devices (CPLDs), etc. For example, accelerator 214(N) may represent a hybrid device, such as one that includes a CPU core embedded in an FPGA fabric.

In the illustrated example, computer-readable media 204 also includes a data store 220. In some examples, data store 220 includes data storage such as a database, data warehouse, or other type of structured or unstructured data storage. In some examples, data store 220 includes a relational database with one or more tables, indices, stored procedures, and so forth to enable data access. Data store 220 may store data for the operations of processes, applications, components, and/or modules stored in computer-readable media 204 and/or executed by processor(s) 202 and/or 210, and/or accelerator(s) 214. For example, data store 220 may store version data, iteration data, clock data, private data, one or more functions or operators used for evaluating private data of external entities (e.g., sellers of the private data), and various state data stored and accessible by SDE module 218. Alternately, some or all of the above-referenced data may be stored on separate memories 222 such as a memory 222(1) on board CPU type processor 210 (e.g., microprocessor(s)), memory 222(2) on board GPU 212, memory 222(3) on board FPGA type accelerator 214(1), memory 222(4) on board DSP type accelerator 214(2), and/or memory 222(M) on board another accelerator 214(N).

Device 200 may further include one or more input/output (I/O) interface(s) 224, such as I/O interface(s) 114 or 126, to allow device 200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). Device 200 may also include one or more network interface(s) 226, such as network interface(s) 116 or 128, to enable communications between computing device 200 and other networked devices such as other device 120 over network(s) 104 and network storage, such as a cloud network. Such network interface(s) 226 may include one or more network interface controllers (NICs) or other types of transceiver devices to send and receive communications over a network.

Figure 3:
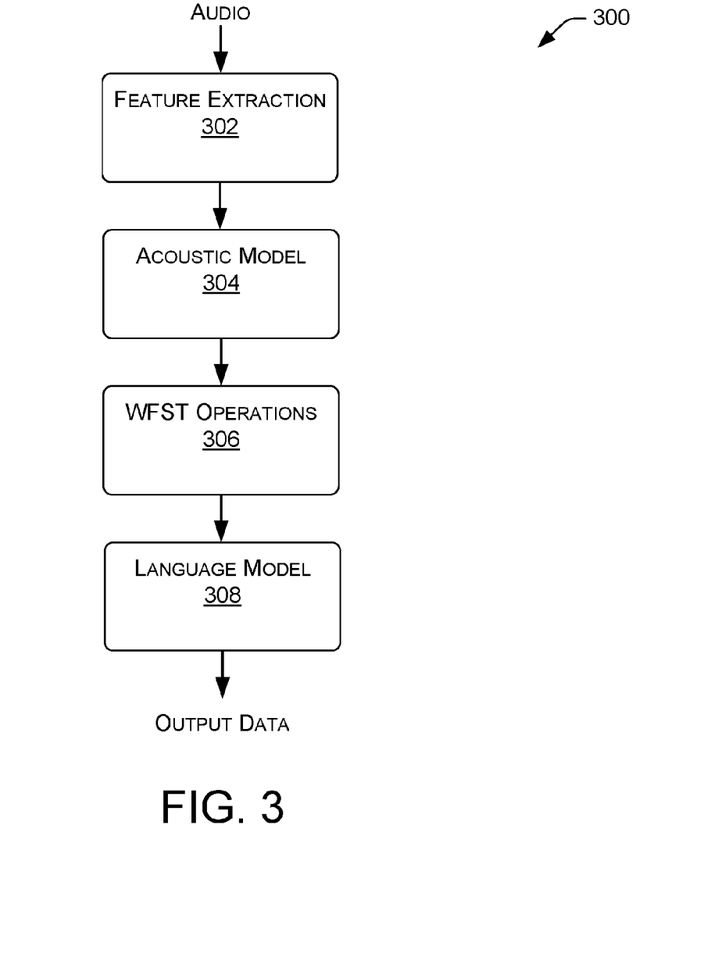
FIG. 3 is a block diagram of processes involved in weighted finite-state transducer operations, according to various examples.

FIG. 3 is a block diagram of a process 300 involved in weighted finite-state transducer operations, according to various examples. Though process 300 is described for cases involving audio input and processing (e.g., for speech recognition systems), process 300 may also be performed for other types of input, such as image signals (e.g., for hand writing recognition systems). Claimed subject matter is not limited to any such type of input.

A feature extraction block 302 may receive an audio input, which may be generated by speech, and may be received in real-time. For example, feature extraction block 302 may receive signals generated by a user talking into a microphone of a computer system. Feature extraction block 302 may decompose the audio signal into component parts, such as into a sequence of symbols or quantities. For example, HMMs may be used in speech recognition because a speech signal can be viewed as a piecewise stationary signal or a short-time stationary signal. In some implementations, an HMM may output a sequence of n-dimensional real-valued vectors (with n being a small integer, such as 10). The HMM may tend to have in each state a statistical distribution that is a mixture of diagonal covariance Gaussians, giving a likelihood for each observed vector. Each word or phoneme may have a different output distribution. An HMM for a sequence of words or phonemes may be made by concatenating individual trained HMMs for separate words and phonemes, for example.

Acoustic model block 304 may receive output from feature extraction block 302. Feature extraction block 302 processes audio input frame by frame (typically each frame is 25 milliseconds in length, and each frame is 10 milliseconds apart, for example). For each frame, the output of block 302 may be a vector of floating numbers. Acoustic model block 304 typically employs deep neural network. It takes a vector of floating numbers as input to the deep neural network. The output may be a vector of floating numbers.

WFST operations block 306 may receive output from acoustic model block 304. For each audio frame, block 306 may output a vector of floating numbers. The block predicts the probability of each internal speed state given an audio frame and its context. The output floating numbers may be proportional to the predicted probabilities. While feature extraction block 302, acoustic model block 304, and language model block 308 may be online processes that perform ASR (e.g., in real-time with audio input), WFST operations block 306 may be an offline process that is performed a priori to being included in the other blocks of process 300.

WFST operations block 306 may perform any of a number of operations on WFSTs. In some examples, WFSTs may represent n-gram grammars, pronunciation dictionaries, context-dependency specifications, HMM topologies, among other things. Such a transducer representation may provide methods, performed by WFST operations block, for combining models and optimizing the models. A WFST may have an input label, an output label and a weight on each of its transitions. Because words may be encoded by an output label, pronunciation transducers may be combined for more than one word without losing word identity. Similarly, HMM structures may be combined into a single transducer that preserves phone model identity. A transducer can represent a relationship between two levels of representation, such as between phones and words or between HMMs and context-independent phones, for example. In particular, a transducer can specify a binary relation between strings: two strings are in the relation if there is a path from an initial to a final state in the transducer that has the first string as the sequence of input labels along the path, and the second string as the sequence of output labels along the path. For a weighted transducer, each string pair is also associated with a weight.

WFST operations block 306 may perform a set of weighted transducer operations to combine, optimize, search and prune WFSTs. Such operations may implement any of a number of functions on one or more of the WFSTs, as explained below. A language model may also be represented as a WFST, and composed and optimized together with block 306, for example.

Language model block 308 may receive a sequence of words, and may predict the likelihood of this word sequence. Such a sequence may be output from WFST operations block 306.

Figure 4:
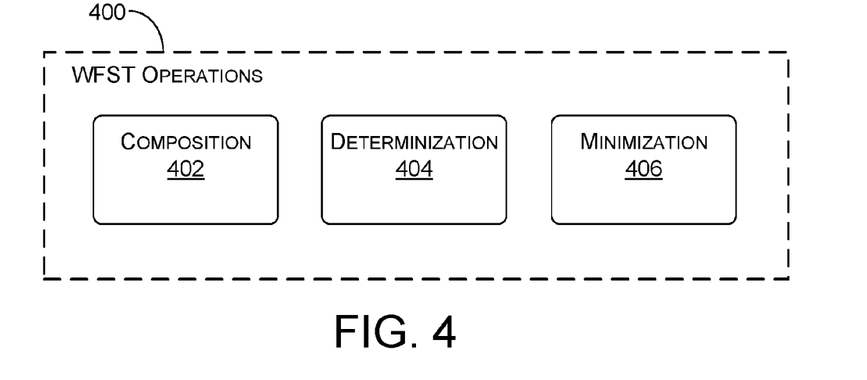
FIG. 4 is a block diagram of weighted finite-state transducer operations, according to various examples.

FIG. 4 is a block diagram of weighted finite-state transducer operations 400, according to some examples. Such operations include composition process 402, determinization process 404, and minimization process 406, though such a list of operations is not exhaustive. Such operations may be performed at WFST operations block 306 (FIG. 3) by transducer operations module 218 (FIG. 2), for example.

Composition process 402 is a transducer operation for combining different levels of representation. For example, a pronunciation lexicon may be composed with a word-level grammar to produce a phone-to word transducer having word strings that are restricted to the grammar. A transducer may represent a binary relation between strings. The composition of two transducers represents their relational composition. In particular, the composition $T=T_1 \circ T_2$ of two transducers $T_1$ and $T_2$ has exactly one path mapping string u to string w for each pair of paths, the first in $T_1$ mapping u to some string v and the second in $T_2$ mapping v to w. The weight of a path in T may be computed from the weights of the two corresponding paths in $T_1$ and $T_2$ with the same operation that computes the weight of a path from the weights of its transitions. If the transition weights represent probabilities, that operation is the product. If instead the weights represent log probabilities or negative log probabilities, the operation is the sum. More generally, the weight operations for a weighted transducer may be specified by a semi-ring.

In some examples, a weighted composition algorithm generalizes a classical state-pair construction for finite automata intersection to weighted transducers. The states of the composition T are pairs of a $T_1$ state and a $T_2$ state. T satisfies the following conditions: (1) its initial state is the pair of the initial state of $T_1$ and the initial state of $T_2$: (2) its final states are pairs of a final state of $T_1$ and a final state of $T_2$, and (3) there is a transition t from $(q_1, q_2)$ to $(r_1, r_2)$ for each pair of transitions $t_1$ from $q_1$ to $r_1$ and $t_2$ from $q_2$ to $r_2$ such that the output label of $t_1$ matches the input label of $t_2$. The transition t takes its input label from $t_1$, its output label from $t_2$, and its weight is the combination of the weights of $t_1$ and $t_2$ done with the same operation that combines weights along a path. Since this computation is local (e.g., involving only the transitions leaving two states being paired) it can be given a lazy implementation in which the composition is generated only as needed by other operations on the composed automaton. The weight of a path in the resulting transducer is the sum of the weights of the matching paths in $T_1$ and $T_2$ (as when the weights represent negative log probabilities).

Composition works by finding common paths through the output labels of one WFST and the input labels of another WFST. It follows that reducing the number of such paths will reduce the final size of the composed WFST. One way to reduce the number of common paths is known as determinisation. A deterministic WFSM is one where any given sequence can correspond to only one path through the WFSM. One way to achieve this is to ensure that each transition out of any given state has a different label. It is possible to consider three different types of determinism: (i) with respect to the input labels: (ii) with respect to the output labels; and (iii) with respect to both the input labels and the output labels combined. Determinism in WFSTs may refer to the first case (e.g., the input labels only). The second case may be achieved by defining the inverse of WFST X to be $X^{-1}$, where the input and output labels are swapped. A WFST can then be said to have a deterministic inverse. The third case may be achieved in software by re-coding the WFST with output labels merged into the input labels, such as by encoding as an acceptor. A composition $X \circ Y$ may proceed relatively easy and produce a smaller result if one or both of $X^{-1}$ and Y are deterministic.

In some examples, the composition of two deterministic transducers is determinisable. Accordingly, in a transducer hierarchy where the composition $X \circ (Y \circ Z)$ is required, if both Y and Z are both deterministic, then $Y \circ Z$ can be determinised and the final transducer is then determinisable.

If a WFST is not deterministic, then the WFST may be forced to be deterministic by using, for example, auxiliary labels. Such labels may be added during the generation of the initial WFST, and can either be removed at some stage in the composition process, or left in place to be used by a decoder. There are two example situations where auxiliary labels may be of use: (i) in the back-off transitions of WFSTs representing n-gram language model; and (ii) in the pronunciations of homophones in the lexicon WFST. In each case, the auxiliary labels may render a non-deterministic WFST either deterministic or determinisable, or ensure that the result of a subsequent composition is determinisable.

For determinization process 404, each state of a deterministic automaton has at most one transition with any given input label and there are no input $\epsilon$-labels. Input and output of a WFST may be labelled with the null label $\epsilon$ (epsilon). Epsilon input labels consume no input, and epsilon output labels produce no output. Epsilon transitions enable WFSTs where the input sequence is not the same length as the output sequence.

A deterministic automaton has irredundancy, wherein it contains at most one path matching any given input string, thus reducing the time and space needed to process the string. This may be particularly beneficial for pronunciation lexicon redundancy in large vocabulary tasks. To benefit from such determinism, a determinization process may be used to transform a nondeterministic weighted automaton into an equivalent deterministic automaton. Two weighted transducers are equivalent if they associate the same output string and weights to each input string. The distribution of the weight or output labels along paths need not be the same in the two transducers.

Weighted determinization generalizes the classical subset method for determinizing unweighted finite automata. Unlike in the unweighted case, not all weighted automata can be determined. Conditions for determinizability are discussed below. Most weighted automata used in speech processing can be either determinized directly or easily made determinizable with simple transformations. However, in some implementations, such efforts to make weighted automata determinizable may be avoided if, as in examples discussed below, determinized weighted automata are not necessary for subsequent operations, such as minimization.

In some examples, weighted determinization may be used to calculate the combined weight of all paths with the same labeling to eliminate redundant paths. If each path represents a disjoint event with probability given by its weight, the combined weight, representing the probability of the common labeling for that set of paths, would be the sum of the weights of the paths. Alternatively, the most probable path may be retained, as is done in shortest path algorithms, leading to the so-called Viterbi approximation. If weights are negative log probabilities, these two alternatives correspond respectively to log summation and taking the minimum. In some implementations, one operation may be used for combining weights along paths and for composition, and a second operation may be used for combining identically labeled paths.

Figure 5:
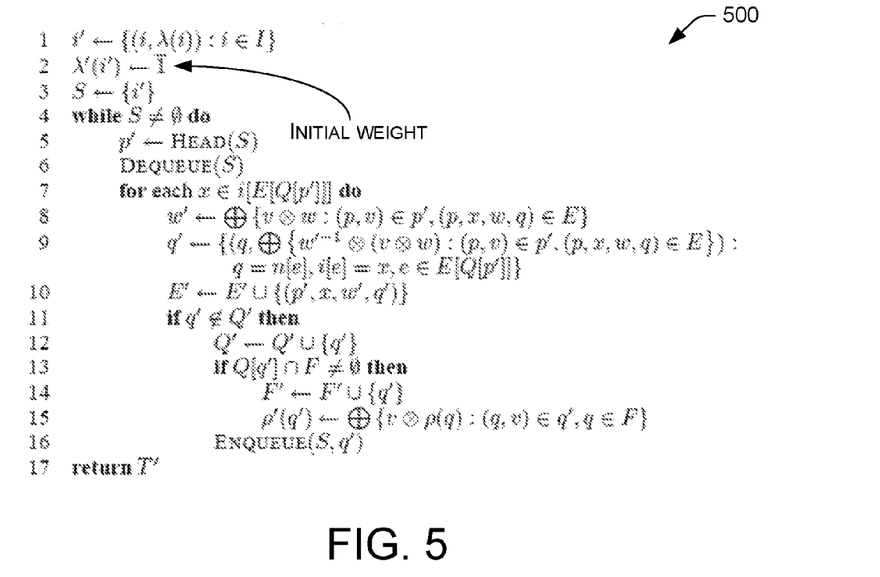
FIG. 5 is a list of example pseudocode for a determinization process.

In some examples, a generic determinization process for weighted automata is a generalization of the classical subset construction for NFAs (unweighted nondeterministic finite automata). A weighted automaton is deterministic if it has a unique initial state and if no two transitions leaving any state share the same input label. The determinization process may apply to weighted automata over a cancellative weakly left-divisible semi-ring that satisfies a mild technical condition. FIG. 5 is a list of example pseudocode 500 for such a determinization process.

A weighted subset p of Q is a set of pairs $(q, x) \in Q \times K$. $Q[p]$ is the set of states q in p, $E[Q[p]]$ is the set of transitions leaving those states, and $i[E[Q[p]]]$ the set of input labels of those transitions.

The states of the result automaton are weighted subsets of the states of the original automaton. A state r of the result automaton that can be reached from the start state by path $\pi$ is the weighted set of pairs $(q, x) \in Q \times K$ such that q can be reached from an initial state of the original automaton by a path $\sigma$ with $i[\sigma]=i[\pi]$ and $\lambda[p[\sigma]] \bullet w[\sigma] = \lambda[p[\pi]] \bullet w[\pi] \bullet x$, where "•" (a circled "x" in FIG. 5) denotes an operation for combining weights along paths and for composition. Thus, x can be viewed as the residual weight at state q. The process takes as input a weighted automaton $A=(A, Q, I, F, E, \lambda, \rho)$ and, when it terminates, yields an equivalent deterministic weighted automaton $A'=(A, Q', I', F', E', \lambda', \rho')$.

The process uses a queue S containing the set of states of the resulting automaton A', yet to be examined. The sets Q', I', F', E' are initially empty. The queue discipline for S can be arbitrarily chosen and does not affect the termination of the algorithm. The initial state set of A' is $I'=\{i'\}$ where i" is the weighted set of the initial states of A with the respective initial weights. Its initial weight is given in lines 1-2 of the pseudocode. S originally contains only the subset I' (line 3). Each time through the loop in lines 4-16, a new weighted subset p' is dequeued from S (lines 5-6). For each x labeling at least one of the transitions leaving a state p in the weighted subset p', a new transition with input label x is constructed. The weight w' associated to that transition is the sum of the weights of all transitions in $E[Q[p']]$ labeled with x pre-•-multiplied by the residual weight v at each state p (line 8). The destination state of the transition is the subset containing all the states q reached by transitions in $E[Q[p']]$ labeled with x. The weight of each state q of the subset is obtained by taking the "op-sum", which denotes combining identically labelled paths (a circled "+" in FIG. 5), of the residual weights of the states p •-times the weight of the transition from p leading to q and by dividing that by w'. The new subset q' is inserted in the queue S when it is a new state (line 16). If any of the states in the subset q' is final, q' is made a final state and its final weight is obtained by summing the final weights of all the final states in q', pre-•-multiplied by their residual weight v (line 14-15).

Determinization does not halt on all input weighted automata. A weighted automaton A is determinizable if the determinization process halts for the input A. With a determinizable input, the process outputs an equivalent deterministic weighted automaton.

Given a deterministic automaton, its size may be reduced by minimization process 406, which can save both space and time. Any deterministic weighted automaton A can be minimized using a minimization process. The resulting weighted automaton B is equivalent to the automaton A. and has the least number of states and the least number of transitions among all deterministic weighted automata equivalent to A. The size of A can be reduced by using a true weighted minimization process. This process works in two steps: the first step pushes weight among transitions, and the second applies the classical minimization process to the result with each distinct label-weight pair viewed as a distinct symbol.

The addition of weights to an FST may introduce difficulties in minimization. For example, if two paths have identical labels but different weights, then they cannot be combined. The solution is to recognize that WFSTs are defined such that the alignment of the weights and labels is not important, so just the total weight over a path may be considered. Weights may be shifted along a path arbitrarily without changing the function of the WFST. Weight pushing is the name given to this shifting of weight. Weight pushing may be applied in such a way as to make parallel paths identical so they can be combined. Minimization of WFSTs may thus be reliant upon weight pushing.

A deterministic weighted automaton is said to be minimal if there is no other deterministic weighted automaton with a smaller number of states that represents the same mapping from strings to weights. It can be shown that the minimal deterministic weighted automaton has also the minimal number of transitions among all equivalent deterministic weighted automata.

Two states of a deterministic weighted automaton are said to be equivalent if exactly the same set of strings label the paths from these states to a final state, and the total weight of the paths for each string, including the final weight of the final state, is the same. Thus, two equivalent states of a deterministic weighted automaton can be merged without affecting the function realized by that automaton. A weighted automaton is minimal when it is not possible to create two distinct equivalent states after any pushing of the weights along its paths.

In some examples, the general minimization process for weighted automata includes first applying a weight pushing algorithm to normalize the distribution of the weights along the paths of the input automaton, and then of treating each pair (label, weight) as a single label and applying classical (unweighted) automata minimization.

Figure 6:
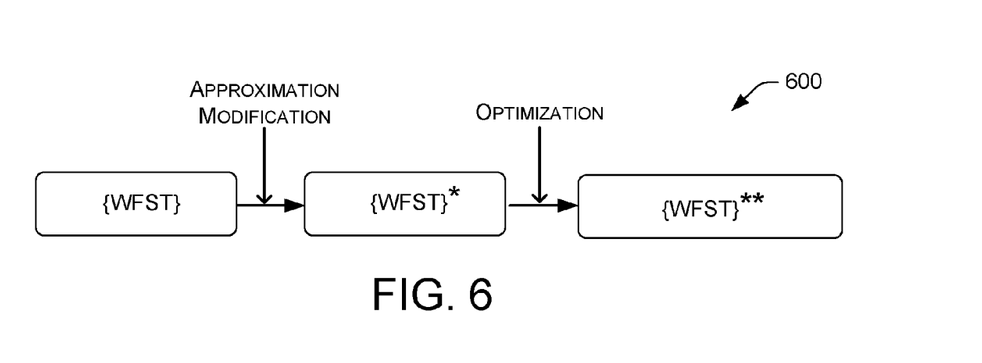
FIG. 6 is a block diagram of weighted finite-state transducer operations involving optimization processes, according to various examples.

FIG. 6 is a block diagram of weighted finite-state transducer operations 600 involving optimization processes, according to various examples. In some implementations, operations 600 is the same as or similar to WFST operations block 306, illustrated in FIG. 3. {WFST} is a set of the transducers H, C, L, and G, which may be used as speech recognition transducers. H is a transducer that corresponds to a hidden Markov model, C represents a context-dependency transducer, L is a pronunciation lexicon, and G corresponds to word-level grammar (e.g., for a language model). H may be based on an audio signal, such as that illustrated in FIG. 3.

In some examples, {WFST} may be modified (that is, any of H, C, L, and G may be modified) in a process called approximation modification. This process results in a set of transducers {WFST}*, which includes a set of individually modified transducers H*, C*, L*, and G*.

In some examples, {WFST}* may be modified (that is, any of H*, C*, L*, and G* may be modified) in a process called optimization. This process results in a single, statically-compiled and optimized recognition transducer that maps from context-dependent phones to words. Such a result is an optimized composed set of transducers H*∘C*∘L*∘G*, indicated by {WFST}**.

Process 600 may be performed if the recognition transducer can be determinized, which will be true if each of the component transducers can be determinized. If the context dependency transducer C is constructed in a particular fashion and if the grammar transducer G is an n-gram language model, then they will be determinizable. However, L may not be determinizable. In particular, if L has ambiguities, namely homophones (two distinct words that have the same pronunciation), then L cannot be determinized as is. Thus, for example, auxiliary phone symbols may be introduced at word ends to disambiguate homophones to create a transformed lexicon L*, as in process 600. Additionally, process 600 may create a modified context dependency transducer C* that additionally pairs the context-independent auxiliary symbols found in the lexicon with new context-dependent auxiliary symbols (which may later be rewritten to epsilons after all optimizations). In some implementations, the optimized transducer {WFST}** may be expressed as $$N=\min(\det(C^*\circ(L^*\circ G))).$$

In various examples, the pronunciation lexicon L is a Kleene closure of the union of individual word pronunciations. For this transducer to efficiently compose with G, the output (word) labels may be placed on the initial transitions of the words. Other locations may lead to delays in composition matching, which could consume significant time and space.

As mentioned above, transducer L is generally not determinizable, particularly in the presence of homophones. But, even without homophones, transducer L may not be determinizable because the first word of the output string may not be known before the entire phone string is scanned. Such unbounded output delays make L non-determinizable. Various techniques, however, may allow for L to be determinizable. One such technique may be an introduction of auxiliary phone symbols to mark the end of a phonetic transcription of each word. In some implementations however, as described below, L need not be determinizable to generate a composition H∘C∘L∘G.

If C represents a context-dependency transducer from context-dependent phones to context independent phones, then C∘L∘G gives a transducer that maps from context-dependent phones to word strings restricted to the grammar G.

The context-dependency transducer C may accept all paths containing the auxiliary symbols added to L* if C is to be made determinizable which, as described below, need not be necessary. For determinizations at the context dependent phone level and distribution level, each auxiliary phone must be mapped to a distinct context dependent-level symbol. Thus, self-loops may be added at each state of C mapping each auxiliary phone to a new augmented auxiliary context-dependent phone C*. Similarly, in some examples, self-loops may be added at an initial state of H to generate H*.

In some examples, grammar G may be approximated to reduce its size. The word-level grammar G may be a finite-state model in speech recognition. Stochastic n-gram models, common in large vocabulary speech recognition, may be represented compactly by finite-state models. For example, a bigram (n=2) has a state for every word and a transition from a first state to a second state for every bigram that is seen in a training corpus. The transition has a particular weight, but the weight of a bigram that is not seen in the training data can be estimated, for example, by backing-off to the unigram (n=1). The unseen bigram could be represented as a transition between states in the bigram automaton just as a seen bigram. However, this would result in a very large number of transitions in the automaton, corresponding to the vocabulary size. An approximation, with the introduction of a back-off state, avoids this. In this model, an unseen bigram is represented as two transitions: an ϵ-transition from a first state to a second state with a first weight and a transition from the second state to a third state with second weight. This is an approximation since seen bigrams may also be read as backed-off unigrams. However, since the seen bigram typically has higher probability than its backed-off unigram, it is usually a good approximation. A similar construction may be used for higher-order n-grams.

Figure 7:
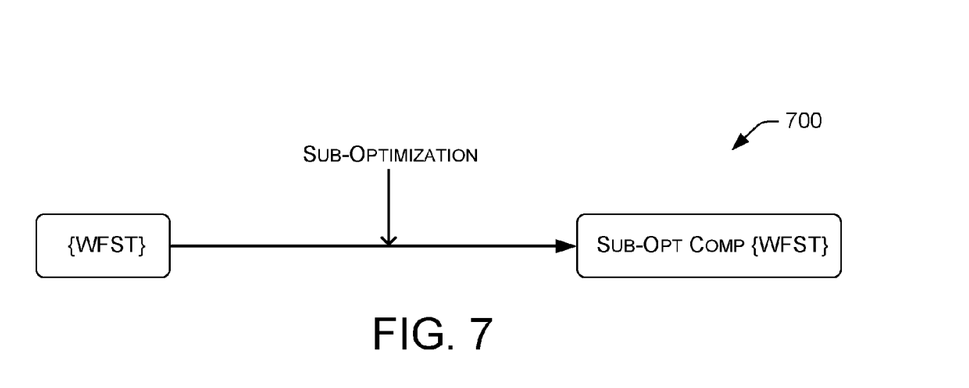
FIG. 7 is a block diagram of weighted finite-state transducer operations involving sub-optimization processes, according to various examples.

FIG. 7 is a block diagram of weighted finite-state transducer operations involving a sub-optimization process 700, according to various examples. Process 700 may be similar to or the same as process 600 except that, among other things, some of the modifications made to the various transducers of {WFST} in process 600 are not made in process 700. For example, a back-off approximation for grammar G need not occur in process 700. Also, an introduction of auxiliary phone symbols to mark the end of a phonetic transcription of each word to allow for L to be determinizable need not occur in process 700. Moreover, self-loops need not be added at each state of C. Thus mapping each auxiliary phone to a new augmented auxiliary context-dependent phone C* need not occur in process 700. Also, in some examples, self-loops need not be added at an initial state of H to generate H*.

As illustrated in FIG. 7, process 700 may involve a "sub-optimization" process to transform {WFST} to a sub-optimized composition of {WFST}, denoted as "sub-opt comp." The sub-optimization process generally avoids at least a portion of the approximation modification and optimization procedures that occur in process 600, which places restrictions on the input search graph. Accordingly, modification of an original input search graph is often necessary for algorithms and implementations to work in process 600. Such modification, however, introduces artificial optimization obstacles that may negatively affect the efficiency of the process. Also, with such modification, though the final search graph may be constructed and optimized to maximal optimality, it is optimal on changed inputs. Process 700, on the other hand, uses a set of WFST algorithms that accept more general input search graphs and may use unchanged inputs. This enables construction of relatively efficient ASR decoding software, which may be subsequently used in an online process.

Thus, process 700 does not pursue theoretical optimality and the process is able to optimize the search graphs as is. Even though process 700 may not reach optimality, in practice the process may produce better results as compared to process 600 because inputs are kept intact.

Figure 8:
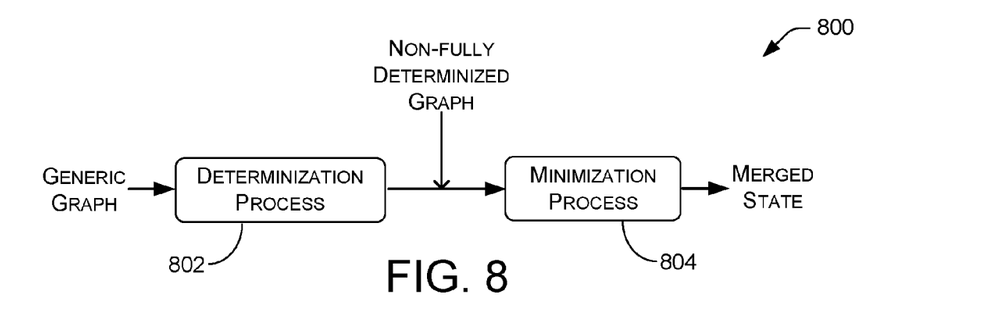
FIG. 8 is a block diagram of a portion of weighted finite-state transducer operations involving sub-optimization processes, according to various examples.

FIG. 8 is a block diagram of a portion of weighted finite-state transducer operations involving a sub-optimization process 800, according to various examples. Process 800 may be similar to or the same as a portion of process 700 illustrated in FIG. 7. Process 800 includes a determinization process 802 and a minimization process 804. The determinization process accepts a generic graph, and need not generate a fully determinized output graph. This is in contrast to determinization conditions in process 600, for example. Pseudo code 500 illustrated in FIG. 5 may be used to generate a (partially) determinized output graph.

Minimization process 804 accepts a non-deterministic (e.g., a non-fully determinized) graph. Process 804 may optimize a non-deterministic graph. A goal of this process is to merge states and end up with a graph that is smaller than the original graph, while having the same function. For example, the process may include first placing all states into two clusters, then splitting the cluster based, at least in part, on the outgoing transition of the states in the cluster. If a cluster cannot be split by outgoing transitions, the states in the cluster can be merged into one resulting merged state. In some implementations, the minimization process operates in iterations. Each iteration may use a routine described in the following pseudo code:

```
Optimize(T):
    Keep a state cluster list: L;
    Keep a new state map: M; // this maps old state id to new state id
    Keep a reverse lookup state map: R; // this indicates what states
can transition to a particular state
    Keep a work queue: Q; // this stores the id of the clusters that require
split
    Create two clusters and add to L: CF contains all the final states, C1
contains all the other states;
    Map all final states to CF, and all other states to C1;
    Insert C1 into Q;
    Repeat the following until Q is empty:
        Take one cluster C from Q;
        Examine transitions of all the states in C;
        Two states are considered identical if they transition to the same
new states (cluster), and the transition properties (input/output/cost) are
the same;
        Group states by above rule, if the number of group > 1, then
split the cluster into two, and add to L, and update M;
        Find out originating states to the new clusters using R;
        Find out clusters corresponding to the originating states using M;
        Add these clusters to Q;
    Construct new graph using L and M;
END
```

Each iteration can be described in the following pseudo code:

```
MinimizeOneRound(T):
    Do push weight on T;
    Optimize T;
    Reverse T; // reverse here means originating state now becomes
targeting state
    Do push weight;
    Optimize T; // since the input graph is not deterministic, doing
this step helps reduce the graph size; for deterministic graph, this
will have no effect
    Restore T;
END
```

The process can be terminated if there is no reduction, or by limiting the number of iterations, for example.

In some examples, process 800 may be used for construction and optimization of a WFST graph, given two or more generic input WFST graphs. In such a process, modifications to the input WFST graphs are not made. Consider two input graphs $W_1$, and $W_2$. A composition operation may be used to build one generic WFST graph $W_3$ from $W_1$ and $W_2$. Such composition may be performed in a standard fashion, as described above for the composition of two WFSTs. The generic WFST graph $W_3$ (resulting from the composition operation) may not be determinizable. Thus, a determinization process, such as 804, may not be able to change $W_3$ into a deterministic WFST. Nevertheless, process 800 (and 700) applies a determinization process. The end result is a graph $W_4$, that is determinized for the most part, but may not be completely deterministic.

WFST graph $W_4$ may be provided to minimization process 804. In some implementations, a minimization process for achieving a final search graph having maximal optimality, such as the minimization process used in process 600, requires an input WFST graph be deterministic. However, $W_4$ is generally not deterministic. Thus, minimization process 804 has the following features: If two states $S_1$ and $S_2$ share the same input/output/cost, then they can be merged into one state, which will result in a new WFST graph with one less state. The new WFST graph may have the same semantics as the old WFST graph. As mentioned above, minimization process 804 is iterative. For each iteration, the process examines each state of the graph to determine if the state can be merged with other states. Such merging will be performed if possible, and a new graph $W_5$ is created, which has less states than does $W_4$.

Minimization process 804 may be terminated if one iteration does not reduce state count, or the reduction is less than a predefined threshold, or if a predefined number of iterations is reached.

Process 800 does not guarantee the optimality of the final graph, but in practice process 800 produces a well-optimized graph. And since there is no modification to the input graphs, there may be no loss of accuracy, and code (e.g., for online ASR) that uses the final graph tends to be simple and fast.

Figure 9:
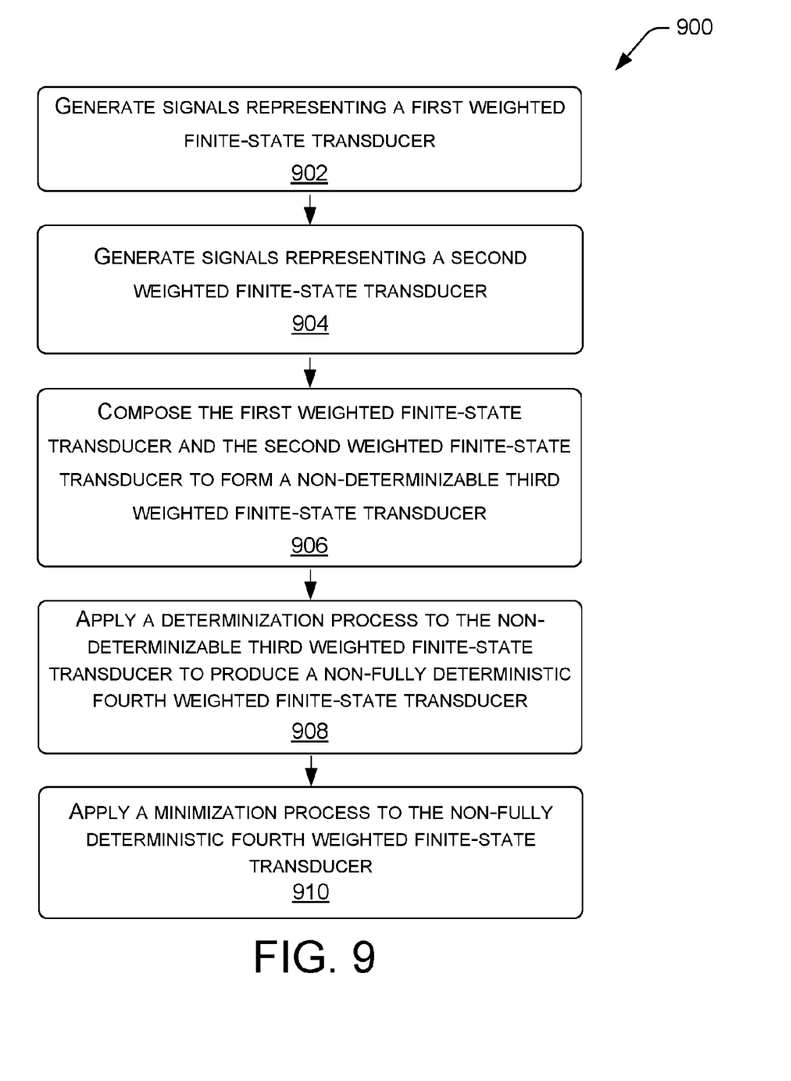
FIG. 9 is a flow diagram illustrating a process for generating a weighted finite-state transducer involving sub-optimization processes, according to some examples.

FIG. 9 is a flow diagram illustrating a process for generating a weighted finite-state transducer involving sub-optimization processes, according to some examples. The flows of operations illustrated in FIG. 9 are illustrated as a collection of blocks and/or arrows representing sequences of operations that can be implemented in hardware, software, firmware, or a combination thereof. The order in which the blocks are described is not intended to be construed as a limitation, and any number of the described operations can be combined in any order to implement one or more methods, or alternate methods. Additionally, individual operations may be omitted from the flow of operations without departing from the spirit and scope of the subject matter described herein. In the context of software, the blocks represent computer-readable instructions that, when executed by one or more processors, configure the processor to perform the recited operations. In the context of hardware, the blocks may represent one or more circuits (e.g., FPGAs, application specific integrated circuits—ASICs, etc.) configured to execute the recited operations.

Any process descriptions, variables, or blocks in the flows of operations illustrated in FIG. 9 may represent modules, segments, or portions of code that include one or more executable instructions for implementing specific logical functions or variables in the process.

Process 900 may be performed by a processor such as processing unit(s) 110, 122, and 202, for example. At block 902, the processor may generate signals representing a first WFST. At block 904, the processor may generate signals representing a second WFST. At block 906, the processor may compose the first WFST and the second WFST to form a non-determinizable third WFST. In some examples, the first WFST may be a context dependent phone model C, the second WFST may be a hidden Markov model H. and the third WFST may be the lexicon model for pronunciation dictionary L. At block 908, the processor may apply a determinization process to the non-determinizable third weighted finite-state transducer to produce a non-fully deterministic fourth weighted finite-state transducer. At block 910, the processor may apply a minimization process to the non-fully deterministic fourth weighted finite-state transducer. For example, the minimization process may include determining whether two states of the non-fully deterministic fourth WFST share the same input/output/cost parameters. If the two states share the same input/output/cost parameters, then the processor may merge the two states into one state, thus forming a fifth WFST that includes the one state.

Example Clauses

A. A system comprising: one or more processors; and computer-readable media having instructions that, when executed by the one or more processors, configure the one or more processors to perform operations comprising: generating signals representing a first weighted finite-state transducer (WFST); generating signals representing a second WFST; composing the first WFST and the second WFST to form a non-determinizable third WFST; and applying a determinization process to the non-determinizable third WFST to produce a non-fully deterministic fourth WFST.

B. The system as paragraph A recites, the operations further comprising: applying a minimization process to the non-fully deterministic fourth WFST.

C. The system as paragraph B recites, wherein the minimization process comprises: determining whether two states of the non-fully deterministic fourth WFST share the same input/output/cost parameters; if the two states share the same input/output/cost parameters, then merging the two states into one state; and forming a fifth WFST that includes the one state.

D. The system as paragraph C recites, wherein the fifth WFST includes less states as compared to the fourth WFST.

E. The system as paragraph C recites, wherein the fifth WFST is a combined weighted speech transducer.

F. The system as paragraph A recites, wherein the first WFST is a context dependent phone model C, the second WFST is a hidden Markov model H, and the third WFST is the lexicon model for pronunciation dictionary L.

G. A method comprising: generating signals representing a hidden Markov model (HMM) transducer; generating signals representing a context dependent phone model; generating signals representing a lexicon model for pronunciation dictionary; generating signals representing a Language Model for sentence probability; composing (i) the HMM transducer, (ii) the context dependent phone model, (iii) the lexicon model for pronunciation dictionary, and (iv) the language model for sentence probability to form a non-optimized composed transducer; and maintaining self-loops in the HMM transducer during the composing.

H. The method as paragraph G recites, wherein the composing is performed with the lexicon model for pronunciation dictionary lacking added disambiguation symbols.

I. The method as paragraph G recites, wherein the non-optimized composed transducer is a combined weighted speech transducer.

J. The method as paragraph G recites, wherein each of the (i) HMM transducer, (ii) the context dependent phone model, (iii) the lexicon model for pronunciation dictionary, and (iv) the language model for sentence probability respectively represent input search graphs.

K. The method as paragraph G recites, wherein the non-optimized composed transducer is configured to generate a search graph.

L. The method as paragraph G recites, wherein the non-optimized composed transducer is sub-optimal by resulting from a minimization process performed on a non-deterministic transducer.

M. The method as paragraph G recites, wherein the non-optimized composed transducer is configured to operate on an audio signal.

N. The system as paragraph G recites, wherein the language model for sentence probability is an n-gram model, where n is a positive integer.

O. The method as paragraph G recites, wherein each of (i) the HMM transducer, (ii) the context dependent phone model, (iii) the lexicon model for pronunciation dictionary, and (iv) the language model for sentence probability are weighted transducers.

P. A system comprising: computer-readable media; and a large-vocabulary, context-dependent speech recognizer comprising: a feature extractor for extracting features of input speech signals and applying sequences of one or more labels to the extracted features, a non-optimized composed weighted speech transducer, the non-optimized composed weighted speech transducer being stored in the computer-readable media and being based on signals representing a hidden Markov model (HMM) transducer, a context dependent phone model, a lexicon model for pronunciation dictionary, and an N-gram language model for sentence probability; and a decoder for outputting decisions about the input speech signals based, at least in part, on the sequences of labels and the non-optimized composed weighted speech transducer.

Q. The system as paragraph P recites, wherein the non-optimized composed weighted speech transducer is configured to generate search graphs that are sub-optimal as a result of the non-optimized composed weighted speech transducer being generated by a minimization process performed on a non-deterministic transducer.

R. The system as paragraph P recites, wherein each of the (i) HMM transducer, (ii) the context dependent phone model, (iii) the lexicon model for pronunciation dictionary, and (iv) the N-gram language model for sentence probability respectively represent input search graphs.

S. The system as paragraph P recites, wherein the non-optimized composed weighted speech transducer is configured to generate a search graph.

T. The system as paragraph P recites, wherein the feature extractor is configured to operate online and synchronously with the input speech signals and the non-optimized composed weighted speech transducer is produced offline and asynchronously with the input speech signals.

Although the subject matter has been described in language specific to structural features and/or methodological acts, it is to be understood that the subject matter defined in the appended claims is not necessarily limited to the specific features or acts described. Rather, the specific features and steps are disclosed as example forms of implementing the claims.

Unless otherwise noted, all of the methods and processes described above may be embodied in whole or in part by software code modules executed by one or more general purpose computers or processors. The code modules may be stored in any type of computer-readable storage medium or other computer storage device. Some or all of the methods may alternatively be implemented in whole or in part by specialized computer hardware, such as FPGAs, ASICs, etc.

Conditional language such as, among others, "can," "could," "may" or "may," unless specifically stated otherwise, are understood within the context to present that certain examples include, while other examples do not include, certain features, variables and/or steps. Thus, such conditional language is not generally intended to imply that certain features, variables and/or steps are in any way required for one or more examples or that one or more examples necessarily include logic for deciding, with or without user input or prompting, whether certain features, variables and/or steps are included or are to be performed in any particular example.

Conjunctive language such as the phrase "at least one of X, Y or Z," unless specifically stated otherwise, is to be understood to present that an item, term, etc. may be either X, Y, or Z, or a combination thereof.

Any process descriptions, variables or blocks in the flow diagrams described herein and/or depicted in the attached figures should be understood as potentially representing modules, segments, or portions of code that include one or more executable instructions for implementing specific logical functions or variables in the routine. Alternate implementations are included within the scope of the examples described herein in which variables or functions may be deleted, or executed out of order from that shown or discussed, including substantially synchronously or in reverse order, depending on the functionality involved as would be understood by those skilled in the art.

It should be emphasized that many variations and modifications may be made to the above-described examples, the variables of which are to be understood as being among other acceptable examples. All such modifications and variations are intended to be included herein within the scope of this disclosure and protected by the following claims.

What is claimed is:

1. A system comprising:
a non-transitory, computer-readable media having computer-executable instructions stored thereon; and
one or more hardware processors in communication with the non-transitory, computer-readable media that, having executed the computer-executable instructions are configured to:
instantiate a feature extractor for extracting features of input speech signals and applying sequences of one or more labels to the extracted features;
instantiate a non-optimized composed weighted speech transducer, the non-optimized composed weighted speech transducer being stored in the computer-readable media and being based on signals representing a hidden Markov model (HMM) transducer, a context dependent phone model, a lexicon model for pronunciation dictionary, and an N-gram language model for sentence probability; and
instantiate a decoder for outputting decisions about the input speech signals based, at least in part, on the sequences of labels and the non-optimized composed weighted speech transducer.

2. The system of claim 1, wherein the non-optimized composed weighted speech transducer is configured to generate search graphs that are sub-optimal as a result of the non-optimized composed weighted speech transducer being generated by a minimization process performed on a non-deterministic transducer.

3. The system of claim 1, wherein each of the (i) HMM transducer, (ii) the context dependent phone model, (iii) the lexicon model for pronunciation dictionary, and (iv) the N-gram language model for sentence probability respectively represent input search graphs.

4. The system of claim 1, wherein the non-optimized composed weighted speech transducer is configured to generate a search graph.

5. The system of claim 1, wherein the feature extractor is configured to operate online and synchronously with the input speech signals and the non-optimized composed weighted speech transducer is produced offline and asynchronously with the input speech signals.

6. A method comprising:
extracting features of input speech signals, by a feature extractor implemented by at least one hardware processor, and applying sequences of one or more labels to the extracted features;
implementing, by the at least one hardware processor, a non-optimized composed weighted speech transducer based on signals representing a hidden Markov model (HMM) transducer, a context dependent phone model, a lexicon model for pronunciation dictionary, and an N-gram language model for sentence probability; and
outputting decisions, by a decoder implemented by the at least one hardware processor, about the input speech signals based, at least in part, on the sequences of labels and the non-optimized composed weighted speech transducer.

7. The method of claim 6, further comprising:
generating search graphs by the non-optimized composed weighted speech transducer.

8. The method of claim 7, wherein the search graphs are sub-optimal as a result of the non-optimized composed weighted speech transducer being generated by a minimization process performed on a non-deterministic transducer.

9. The method of claim 6, wherein each of the (i) HMM transducer, (ii) the context dependent phone model, (iii) the lexicon model for pronunciation dictionary, and (iv) the N-gram language model for sentence probability respectively represent input search graphs.

10. The method of claim 6, wherein:
the feature extractor is configured to operate online and synchronously with the input speech signals; and
the non-optimized composed weighted speech transducer is produced offline and asynchronously with the input speech signals.

11. A non-transitory, computer-readable medium having computer-executable instructions stored thereon that, when executed by one or more hardware processors, cause the one or more hardware processors to perform a plurality of operations comprising:
extracting features of input speech signals, by an instantiated feature extractor, and applying sequences of one or more labels to the extracted features;
implementing a non-optimized composed weighted speech transducer based on signals representing a hidden Markov model (HMM) transducer, a context dependent phone model, a lexicon model for pronunciation dictionary, and an N-gram language model for sentence probability; and
outputting decisions, by an instantiated decoder, about the input speech signals based, at least in part, on the sequences of labels and the non-optimized composed weighted speech transducer.

12. The non-transitory, computer-readable medium of claim 11, wherein the plurality of operations further comprise:
generating search graphs by the non-optimized composed weighted speech transducer.

13. The non-transitory, computer-readable medium of claim 12, wherein the search graphs are sub-optimal as a result of the non-optimized composed weighted speech transducer being generated by a minimization process performed on a non-deterministic transducer.

14. The non-transitory, computer-readable medium 26, wherein each of the (i) HMM transducer, (ii) the context dependent phone model, (iii) the lexicon model for pronunciation dictionary, and (iv) the N-gram language model for sentence probability respectively represent input search graphs.

15. The non-transitory, computer-readable medium of claim 11, wherein:
the feature extractor is configured to operate online and synchronously with the input speech signals; and
the non-optimized composed weighted speech transducer is produced offline and asynchronously with the input speech signals.

* * * * *